(12) United States Patent
Gu

(10) Patent No.: US 6,602,080 B1
(45) Date of Patent: Aug. 5, 2003

(54) APPARATUS TO ELECTRICALLY POWER A CIRCUIT BOARD

(76) Inventor: Jing Lu Gu, 1806 Yosemite Dr., Milpitas, CA (US) 95035

( * ) Notice: Subject to any disclaimer, the term of this patent is extended or adjusted under 35 U.S.C. 154(b) by 0 days.

(21) Appl. No.: 09/561,202

(22) Filed: Apr. 27, 2000

(51) Int. Cl.⁷ .............................................. H01R 12/00
(52) U.S. Cl. ........................ 439/82; 439/500; 429/100
(58) Field of Search .......................... 439/82, 83, 500, 439/876; 429/96, 97, 98, 99, 100

(56) References Cited

U.S. PATENT DOCUMENTS

| | | | | |
|---|---|---|---|---|
| 5,624,269 A | * | 4/1997 | Kanamori | 439/83 |
| 5,876,241 A | * | 3/1999 | Frantz | 429/100 |
| 6,024,586 A | * | 2/2000 | Kumagai | 439/83 |

* cited by examiner

Primary Examiner—Tho D. Ta

(57) ABSTRACT

An apparatus for retaining a gold plated battery on a circuit board comprises a gold plated circular cover plate having a circumference, a plurality of support legs extending axially from the circumference of the gold plated circular cover plate, a plurality of prongs extending from each support leg wherein each prong is adapted to fit in respective prong holes on the circuit board, and a gold plated electrical conductor with at least first and second contacts, the first contact adapted for connection to the gold plated battery, and the second contact adapted for connection to an electrical circuit. The support legs extending from the circumference of the circular cover plate are rigid which insures alignment when inserted in to a circuit board. Accordingly, the apparatus is well suited for surface mount technology. The gold plated electrical contacts provide maximum conductivity to the electrical circuit.

7 Claims, 2 Drawing Sheets

APPARATUS TO ELECTRICALLY POWER A CIRCUIT BOARD

TECHNICAL FIELD

The present invention relates generally to manufacturing circuit boards and more specifically to an apparatus for retaining an electric cell that enables the placement of the apparatus onto circuit boards using surface mount technology.

CROSS REFERENCE TO RELATED APPLICATION

The present application cross-references a prior filed co-pending utility patent application Ser. No. 09/531,030 entitled "Apparatus for a Battery Holder on a Circuit Board" to claim the benefit of the prior filed patent application. Sole inventor Jing Lu Gu is named on both the cross referenced co-pending utility patent application Ser. No. 09/531,030 and the present application.

BACKGROUND ART

Manufacturing of circuit boards for integrated circuits and the like have become more and more streamlined. Most integrated circuit systems utilized circuit boards with components connected by a pin in hole (PIH) process. Pins extending from PIH components were inserted into copper plated holes through the circuit board. The PIH components were permanently connected by moving the board over a molten wave of solder with the bottom in contact with the molten wave so that the solder was drawn up into the pinholes to form a metal joint.

With the advent of surface mounted technology, the components are placed on the circuit board where the component leads are soldered to pads on the surface of the circuit board. Solder paste is located on the circuit board where the component leads are placed. Once the components have been placed on the circuit board, heat is applied to the board which activates the solder paste connecting the component leads to the pads on the circuit board. The surface mount technology allows higher density connection since the components are much smaller, connection pads can be spaced closer together, and opposite sides of the circuit board may be utilized for components. The circuit components are contained on a taped reel where automated mechanical component placement devices efficiently populate the circuit board with the circuit components from the taped reel. The surface mount technology greatly reduces the effort and cost of building circuit boards.

Limitations of the surface mounted technology occur when certain circuit components cannot be properly placed on the circuit board using automated mechanical component placement devices. With such limitations, the automated process must include a human intervention step before the circuit boards can be completed. This step increases cost, introduces quality control issues, and slowdowns the manufacturing process of the circuit boards.

Supplying constant uninterrupted power to the circuit board and its circuit components is a challenge with surface mounted technology. Often time the holding fixture for a power cell is not sufficiently robust to maintain positive contact when a sudden impact or jarring occurs. The slight power interruption causes a slight disruption in a device's output. A talking communication card is an example of such a device. It is powered by a number of button cell batteries. During playback, if the talking communication card receives a sudden impact, the output of the card is disrupted.

Therefore, there is a continual need to develop circuit components suitable for surface mount technology that can be used with automated mechanical component placement devices and are able to supply constant uninterrupted power.

DISCLOSURE OF THE INVENTION

The present invention provides a gold plated apparatus for securely retaining a small gold plated battery or electric cell on a printed circuit board for providing electrical power to electronic circuits connected to the circuit board. The novel improved apparatus for retaining the gold plated battery is based on providing rigid support legs that define a gold plated enclosure for the battery so that the apparatus maintains alignment with the pre-drilled holes on the circuit board. Thus, according to one aspect of the invention, the apparatus for retaining a gold plated battery on a circuit board comprises a gold plated circular cover plate having a circumference, a plurality of support legs extending axially from the circumference of the gold plated circular cover plate, a plurality of prongs extending from each support leg wherein each prong is adapted to fit in respective prong holes on the circuit board, and a gold plated electrical conductor with at least first and second contacts, the first contact adapted for connection to a gold plated battery, and the second contact adapted for connection to an electrical circuit. The apparatus is well suited for surface mount technology where automated placement devices place circuit components on circuit boards during the manufacture of the circuit boards. The apparatus maximizes connectivity between the battery and the circuit board by using a gold plated battery coupled to a gold plated apparatus for holding the battery that is soldered to the circuit board.

According to another aspect of the invention, the circular cover plate includes a retainer spring adapted to provide downward force against the battery and the circuit board. The retainer spring aids in holding the battery in place so that positive contact between the battery contacts is maintained.

According to yet another aspect of the invention, the circular cover plate includes a linear section having a bevel retainer adapted to retain the battery within the battery enclosure in the event the circuit card is dropped or otherwise mishandled. The bevel retainer is slanted towards the battery to apply pressure against the battery.

According to another aspect of the invention, the retainer spring pivots against the bevel retainer with the insertion of the battery and forces the bevel retainer against the battery for better retention.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
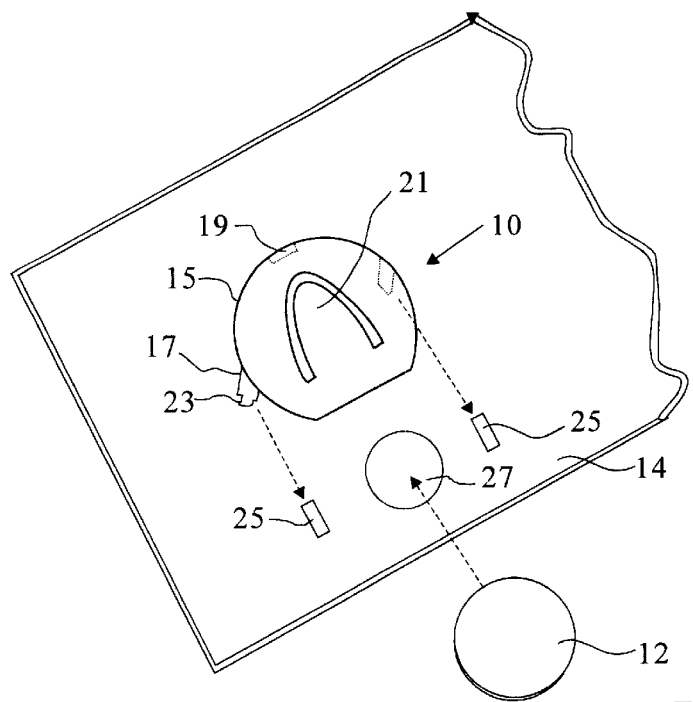
FIG. 1 (PRIOR ART) illustrates an exploded perspective view of a conventional battery retainer apparatus.
Figure 2:
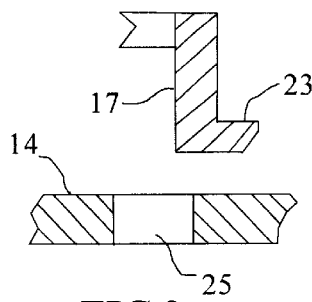
FIG. 2 (PRIOR ART) illustrates a sectional view of a locking tab above the printed circuit board.
Figure 3:
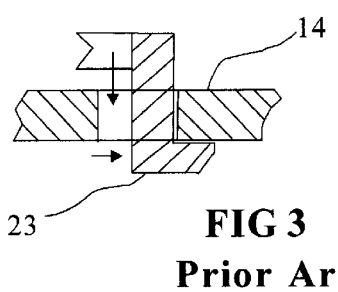
FIG. 3 (PRIOR ART) illustrates a sectional view of a locking tab engaging the printed circuit board.

FIG. 1 (PRIOR ART) illustrates a conventional battery retainer apparatus 10 for holding a small battery or electric cell 12 on a printed circuit board 14, and for providing electrical contacts which engage the battery for use in an electronic circuit. The battery retainer apparatus 10 includes a cover plate 15, "L" shaped locking tabs 17, a battery stop tab 19, and spring contact 21. Extending axially from the cover plate 15, the L shaped locking tabs 17 extend down through the printed circuit board 14 to secure the battery retainer apparatus 10 to the board. The ends of the "L" shaped locking tabs 17 extend radially outward to form feet 23. Cutouts or feet receivers 25 on the printed circuit board 14 are large enough to accommodate the feet 23 of the "L" shaped locking tabs 17 to fit through them, but are aligned with some radial offset as shown in FIG. 2 (PRIOR ART) so that the feet 23 are biased outwardly when inserted to properly and firmly engage the circuit board as shown in FIG. 3 (PRIOR ART).

To insert the feet 23, the "L" shaped locking tabs 17 are flexed slightly in the radial direction. In this manner, the feet 23 of the locking tabs 17 are aligned with the feet receivers 25. When the feet 23 are fully inserted through the feet receivers 25, the "L" shaped locking tabs un-flex and extends radially outward to engage the printed circuit board 14 as shown in FIG. 3 (PRIOR ART). Alternatively, the feet may extend radially inward, with the feet receivers 25 for proper alignment.

Once the battery retainer apparatus 10 is firmly attached, the battery 12 fits within the battery retainer apparatus 10. The battery stop tab 19 prevents the battery 12 from being inserted past the spring contact 21. The spring contact 21 presses against the battery 12 and forces the battery 12 against a circuit board contact 27 on the circuit board 14. The circuit board contact 27 may be slightly raised from the circuit board 14 to insure positive contact with the inserted battery 12.

Figure 4:
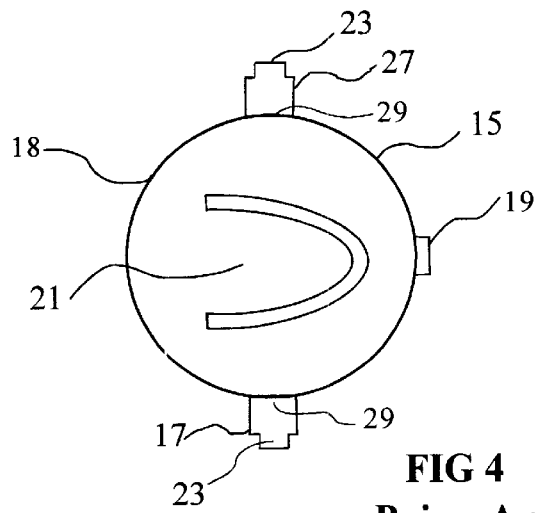
FIG. 4 (PRIOR ART) illustrates a plane view of the conventional battery retainer apparatus.

FIG. 4 illustrates a plane view of the conventional battery retainer apparatus 10. The cover plate 15 is substantially circular except for flat sections 29 where the locking tabs 17 extend from the cover plate 15. The flat sections 29 enable each of the locking tabs 17 to flex radially when the feet 23 are fitted into the feet receivers 25.

The conventional battery retainer apparatus 10 having the "L" shaped locking tabs 17 requires human intervention to fit the feet 23 of the "L" shaped locking tabs into the feet receivers 25. Consequently, present automated mechanical component placement devices cannot be used to place the conventional battery retainer apparatus 10 onto a circuit board.

Figure 5:
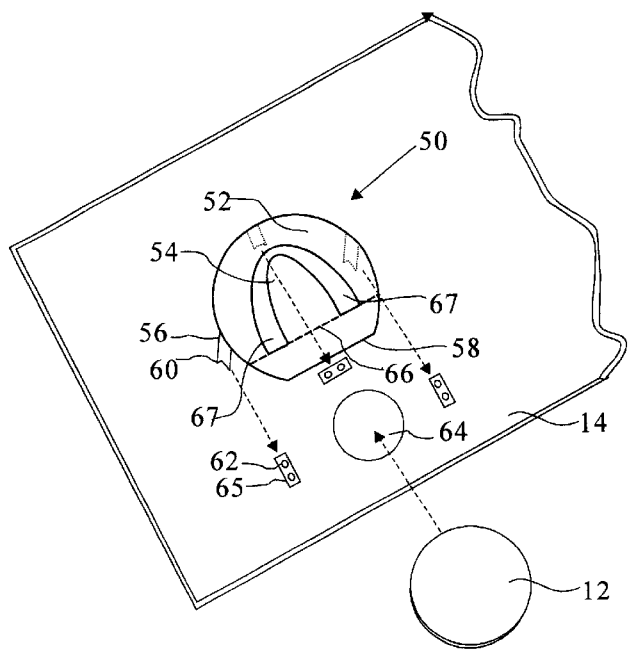
FIG. 5 illustrates an exploded perspective view of a surface mountable battery apparatus according to the present invention.

FIG. 5 illustrates an exploded perspective view of a surface mountable battery apparatus 50 according to the present invention. The battery apparatus holds a small battery or electric cell 12 on a printed circuit board 14, and provides electrical contacts which engage the battery to provide electrical power to the circuit board for use in an electronic circuit. The surface mountable battery apparatus 50 includes a cover plate 52, retaining spring 54, support legs 56, and bevel retainer 58. The battery 12 is gold plated on both the anode and cathode.

Extending axially from the cover plate 52 is a plurality of support legs 56. The support legs 56 each include two prongs 60 extending from the end of each support leg 56. The prongs 60 fit through prong holes 62 in the circuit board 14. The prong holes 62 include pre-applied solder paste 65 for attachment of the battery apparatus 50 to the circuit board 14. The application of solder paste and its use on circuit boards for surface mount technology is well known to those skilled in the art. The prong holes 62 are positioned such that they are aligned with the prongs 60 of the battery apparatus 50. During manufacturing, automated mechanical component placement devices insert the prongs 60 of the battery apparatus through the prong holes 62 of the circuit board 14. Because the prong holes 62 are aligned with the prongs 60; automated placement devices can be used to insert the surface mountable battery apparatus 50 onto the circuit board 14. Later during the manufacturing process, the solder paste 65 adjacent the prong holes 62 is heated to firmly attach and electrically engage the battery apparatus 52 with electrical connections of the circuit board 14.

Figure 8:
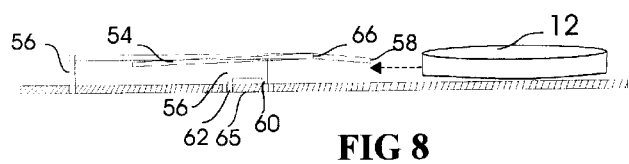
FIG. 8 illustrates a sectional view of FIG. 5.

Once the battery apparatus 50 is properly secured to the circuit board 14, a battery 12 is inserted into the batter apparatus. Two of the three prongs 60 guide the battery 12 within its enclosure between the cover plate 52 and circuit board 14. The third prong 60 provides a stop for the battery. The battery 12 contacts the cover plate 52, retaining spring 54, and a contact 64 on the circuit board 14 to provide electrical connections to the circuit board 14. Areas that contact the battery 12 are gold plated to provide maximum conductivity between the battery 12 and the battery apparatus 50. Accordingly, the cover plate 52, the retaining spring 54 and the contact 64 are gold plated. In another embodiment of the invention, the retaining spring 54 and the contact 64 are gold plated. Referring to FIG. 8, the retaining spring 54 sustains a downward force against the battery 12 to maintain positive contact between the battery 12 and the cover plate 52 and the contact 64. The retaining spring 54 also pivots along a dashed line denoted by reference numeral 66 when the battery 12 is inserted. It should be noted that cut outs 67 for the retaining spring 54 are large to magnify the pivoting action of the retaining spring 54 that is transferred to the bevel retainer 58. The pivoting action forces the bevel retainer 58 against the battery 12 to better secure it within its enclosure and prevents the battery from sliding out of the battery apparatus 50. The bevel retainer 58 includes a downward slant towards the circuit board 14 extending from the dashed line 66 to the end of the bevel retainer 58 for increased grip on the battery 14.

Figure 6:
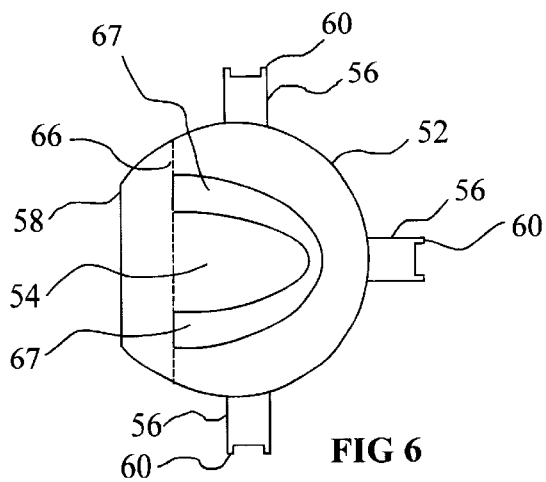
FIG. 6 illustrates a plane view of the surface mountable battery apparatus according to the present invention.

FIG. 6 illustrates a plane view of the surface mountable battery apparatus 50 according to the present invention. The cover plate 52 is circular except for a linear section comprising the bevel retainer 58. The support legs 56 extend from the circumference of the cover plate 52 which increases the strength of the support legs 56 and prevents the support legs 56 from flexing axially. This insures precise alignment of the prongs 60 of the battery apparatus 50 with the prong holes 62 on the circuit board 14. In contrast with the prior art conventional battery apparatus 10 of FIG. 4, the locking tabs 17 extend from flat sections 29 of the cover plate 10 which allows the locking tabs 17 to flex for proper fitting of the feet 23 into their feet receivers 25.

Figure 7:
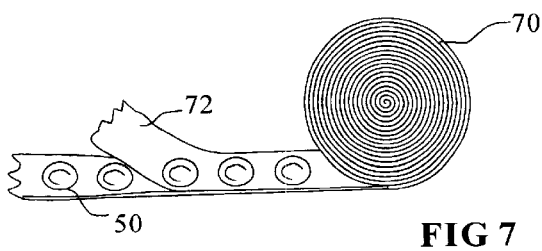
FIG. 7 illustrates a component tape roll containing a plurality of the surface mountable battery apparatuses.

FIG. 7 illustrates a roll 70 of a plurality of surface mountable battery apparatuses 50 suitable for use with automated mechanical component placement devices. A protective tape layer 72 is removed to expose the surface mountable battery apparatus 50 before an automated mechanical component placement device places the battery apparatus onto a circuit board. Automated mechanical component placement devices and its operation are well known to those skilled in the art surface mount technology.

The circuit board 14 with the attached surface mountable battery apparatus 50 is for use in combination with other electrical circuits or within portable devices that employ a self-contained power source. The surface mountable battery apparatus 50 is suitable for automated mechanical component placement devices used in surface mount technology.

The gold plated contacts of the battery and the surface mountable battery apparatus 50 afford superior conductivity between the battery and the components on the circuit board. The superior conductivity reduces the likelihood of circuit disruption when circuit components experience sudden impacts.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. An apparatus for retaining a gold plated battery on a circuit board comprising:
   a gold plated circular cover plate having a circumference;
   a plurality of support legs extending axially from the circumference of said gold plated circular cover plate;
   a plurality of prongs extending from each support leg wherein each prong is adapted to fit in respective prong holes on the circuit board; and
   a gold plated electrical conductor with at least first and second contacts, the first contact adapted for connection to the gold plated battery, and the second contact adapted for connection to an electrical circuit;
   wherein: the plurality of prongs define a battery enclosure and at least one of the prongs provide a stop for the gold plated battery; and
   the gold plated circular cover plate includes a linear section having a bevel retainer adapted to retain the gold plated battery within the battery enclosure and a gold plated retainer spring adapted to pivot against the bevel retainer with insertion of the battery and forces the bevel retainer against the gold plated battery.

2. The apparatus as claimed in claim 1 wherein the bevel retainer is slanted downward towards the gold plated battery.

3. The apparatus as claimed in claim 1 wherein the gold plated circular cover plate having the gold plated retainer spring is adapted to provide downward force against the gold plated batter and the circuit board.

4. The apparatus as claimed in claim 3 wherein the gold plated circular cover plate includes a cutout to provide for the gold plated retainer spring.

5. A system for manufacturing a circuit board having a surface mounted battery retaining apparatus comprising:
   a battery retaining apparatus having:
      a circular cover plate having a circumference and gold plating;
      a plurality of support legs extending axially from the circumference of said circular cover plate; and
      a plurality of prongs extending from each support leg wherein each prong is adapted to fit in respective prong holes on the circuit board; and
   an automated mechanical component placement device configured to place the plurality of prongs of the battery retaining apparatus in the respective prong holes on the circuit board;
   wherein the circular cover plate includes:
      a gold plated retainer spring adapted to provide downward force against a gold plated battery and the circuit board;
      a cutout to provide for the gold plated retainer spring; and
      a linear section having a gold plated bevel retainer adapted to retain the gold plated battery; and
   wherein the gold plated retainer spring pivots against the gold plated bevel retainer with insertion of the battery and forces the gold plated bevel retainer against the gold plated battery.

6. The system as claimed in claim 5 wherein the respective prong holes include solder paste.

7. The system as claimed in claim 5 wherein the gold plated bevel retainer is slanted towards the gold plated battery.

* * * * *